United States Patent
Sherman et al.

(10) Patent No.: US 6,636,897 B1
(45) Date of Patent: Oct. 21, 2003

(54) SELECTIVE INFORMATION SUBSET SYNCHRONIZATION BASED ON SINGLE USER ACTION

(75) Inventors: Roman Sherman, Bellevue, WA (US); Peter M. Mansour, Seattle, WA (US); Chad A. Schwitters, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/406,948

(22) Filed: Sep. 28, 1999

(51) Int. Cl.[7] .............................................. G06F 15/16
(52) U.S. Cl. ........................ 709/248; 709/206; 707/201
(58) Field of Search .................................. 709/200, 204, 709/206, 248, 315; 707/201, 8, 204

(56) References Cited

U.S. PATENT DOCUMENTS

| | | | |
|---|---|---|---|
| 5,625,818 A | * 4/1997 | Zarmer et al. | 707/104 |
| 5,758,354 A | * 5/1998 | Huang et al. | 707/201 |
| 5,778,389 A | * 7/1998 | Pruett et al. | 709/204 |
| 5,832,510 A | * 11/1998 | Ito et al. | 707/201 |
| 5,838,923 A | * 11/1998 | Lee et al. | 709/206 |
| 5,961,590 A | * 10/1999 | Mendez et al. | 709/206 |
| 5,966,714 A | * 10/1999 | Huang et al. | 707/201 |
| 5,974,238 A | * 10/1999 | Chase, Jr. | 709/248 |
| 6,018,762 A | * 1/2000 | Brunson et al. | 709/206 |
| 6,324,544 B1 | * 11/2001 | Alam et al. | 707/201 |
| 6,345,313 B1 | * 2/2002 | Lindholm | 709/315 |
| 6,505,214 B1 | * 1/2003 | Sherman et al. | 707/201 |

OTHER PUBLICATIONS

Selecting and Maintaining Materialized Views for Message..—Gupta, Srivastava, ; www–db.stanford.edu/pub/papers/message.p.*
Concord: Re–Thinking the Division of Labor in a Distributed..—William Lee (1993) ; ftp.cs.washington.edu/tr/1993/12/UW–CSE–93–12–05.PS.Z.*
Dermott et al, Doc, Wyatt, and Virgil: Protoyping Storage Jamming Defenses, www.itd.nrl.navy.mil/ITD/5540/publications/CHACS/1997/1997mcdermott–ACSAC97.ps.*
E–Mail Position Paper: IMAP4, www.csuchico.edu/inf/T2000/epos.html.*

* cited by examiner

*Primary Examiner*—Mark R. Powell
*Assistant Examiner*—Thong Yu
(74) *Attorney, Agent, or Firm*—Merchant & Gould P.C.

(57) ABSTRACT

An apparatus and method for selectively synchronizing a subset of objects of an object set between first and second object stores. A subset of objects is defined as a plurality of selected objects of the object set. A selection identifier corresponding to an exclusive synchronization mode designation is received. Where the selection identifier corresponds to a first identification state, all of the objects of the object set are synchronized. Where the selection identifier corresponds to a second state, only the subset of objects is synchronized, whereby the plurality of objects comprising the subset of objects can be designated for synchronization without individual designation of the objects targeted for synchronization.

43 Claims, 10 Drawing Sheets

SELECTIVE INFORMATION SUBSET SYNCHRONIZATION BASED ON SINGLE USER ACTION

TECHNICAL FIELD

The present invention relates generally to the synchronization of information between computing systems. More particularly, the present invention relates to a method for selectively excluding unnecessary information from a multi-computer synchronization process, while collectively designating a plurality of information items with a single user-selection action.

BACKGROUND OF THE INVENTION

The information age has spawned a myriad of new electronic devices aimed at increasing efficiency, convenience, and ease of use. One such group of devices includes portable computing devices, personal digital assistants and other companion products that enable computer users to maintain access to digital information when away from the home or office computer.

In order to maximize usefulness, these products typically allow information to be transferred to and from other computers. These data transfers are generally accomplished by connecting the portable device to a target computer via a direct connection, modem connection, network connection or the like. The global proliferation of networks has advanced the desirability of these portable devices by allowing access to virtually any information that avails itself on the network, regardless of the user's whereabouts.

Further, certain information can be "synchronized" between the companion device and the user's primary computer to maintain data coherence between the two systems. Synchronization involves an electronic comparison and correlation of data between the companion device and the primary computer (such as a server or personal computer) to maintain data uniformity on both systems. The ability to synchronize changes on any or all systems makes portable computing devices powerful tools in the quest for immediate and accurate information access.

Despite the obvious benefits of these portable electronic devices, there are limitations on their use. For example, they have limited memory capabilities due to their relatively small size and low power consumption requirements. Further, connection costs may be based on connection time, and synchronization may prove expensive. Because these portable devices are typically connected to other computers or networks via modem, synchronization times may be significant due to speed limitations of modem technologies.

Technologies for synchronizing these companion devices with other computers generally involve synchronizing all information which the companion device is capable of receiving. For example, synchronizing changes in e-mail folder hierarchies between a companion device and an office computer might involve synchronizing all folders in the hierarchy. This, however, may not be desirable. As previously indicated, the companion device has limited memory. It may prove wasteful of memory resources to synchronize all folders when the user is uninterested in certain folders in the hierarchy, since the companion device must increasingly allocate memory as the number of stored folders increases. Further, since the portable devices are generally used as companions to desktop or server e-mail systems, the user may only be willing to expend connection time and memory resources for the e-mail categories most important to the user. Full e-mail folder accessibility will always be available to the user at the user's primary computer.

One solution might be to require users to explicitly designate each and every category of information to be synchronized. In this way, not "all" information would be synchronized, and this could reduce connection times and memory allocation requirements. However, it may be unreasonable to expect users to specifically designate each and every such category. For example, a folder hierarchy may be configured to allow for thousands or tens of thousands of folders. It would be prohibitively time-consuming and aggravating for users to explicitly designate which of this multitude of folders should be, and continue to be, synchronized.

SUMMARY OF THE INVENTION

The present invention is generally directed to a manner of synchronizing information between computer systems, such as between client and server computer systems. A user is allowed to collectively identify multiple synchronizable objects, such as folders in a folder hierarchy, as a subset of objects to be synchronized, while excluding the remaining objects of the object set from synchronization. Only a single action need be taken by the user to collectively designate this subset for synchronization. The invention therefore allows minimal action to be taken by the user in order to exclude objects for which synchronization is deemed unnecessary.

One aspect of the invention allows a subset of objects of an object set to be selectively synchronized between first and second object stores. The subset of objects is defined as multiple objects of the object set. A selection identifier corresponding to an exclusive synchronization mode designation entered by a user is used to determine the mode in which synchronization will occur. Where the selection identifier is in a first state, all of the objects of the object set will be synchronized. Where the selection identifier is in a second state, only those objects that compose the defined subset of objects will be synchronized, thereby limiting synchronization to the defined subset of objects.

The consolidated synchronization characteristic of the invention's selective synchronization process can be applied to a wide variety of synchronizable information. One aspect of the invention includes applying the selective synchronization process to an e-mail folder hierarchy. The subsets of the e-mail folder hierarchy are synchronized between computing systems, such as a server and a client or "companion" device. The defined subset of information in this case includes particular folders of the email folder hierarchy. Such a subset may include a predetermined branch of the e-mail folder hierarchy, such as the "Inbox" folder branch. When the user has identified a first synchronization mode, all of the folders of the e-mail folder hierarchy will be synchronized. When the user identifies a second synchronization mode, only the collection of folders in the predetermined folder branch are synchronized, thereby limiting the group of folders being synchronized to those deemed worthy of synchronization by the user.

Another aspect of the invention relates to an apparatus equipped to synchronize a selected subset of an e-mail folder hierarchy between server and client computing systems. The apparatus includes a module for defining the subset of the email folder hierarchy as the group of folders associated with a particular branch of the mail folder hierarchy. A user interface module provides for the single-action entry of a synchronization mode designator by a user. A synchronization module synchronizes all of the folders of the e-mail folder hierarchy when the synchronization mode designator identifies a first synchronization mode, and synchronizing only the folders of the particular hierarchy branch when the synchronization mode designator identifies a second synchronization mode.

DETAILED DESCRIPTION OF THE INVENTION

The present invention is generally directed to the identification of a desired subset of an information set for multi-computer synchronization. The user is provided with a means to collectively identify a plurality of items to be synchronized, while requiring only a single action to be taken by the user. A plurality of items to be synchronized can be identified by the user without having to individually identify each of those items for synchronization. In this way, a single user action may be carried out which selectively excludes unnecessary information from a multi-computer synchronization operation, and collectively designates a plurality of information items to be synchronized.

Figure 1:
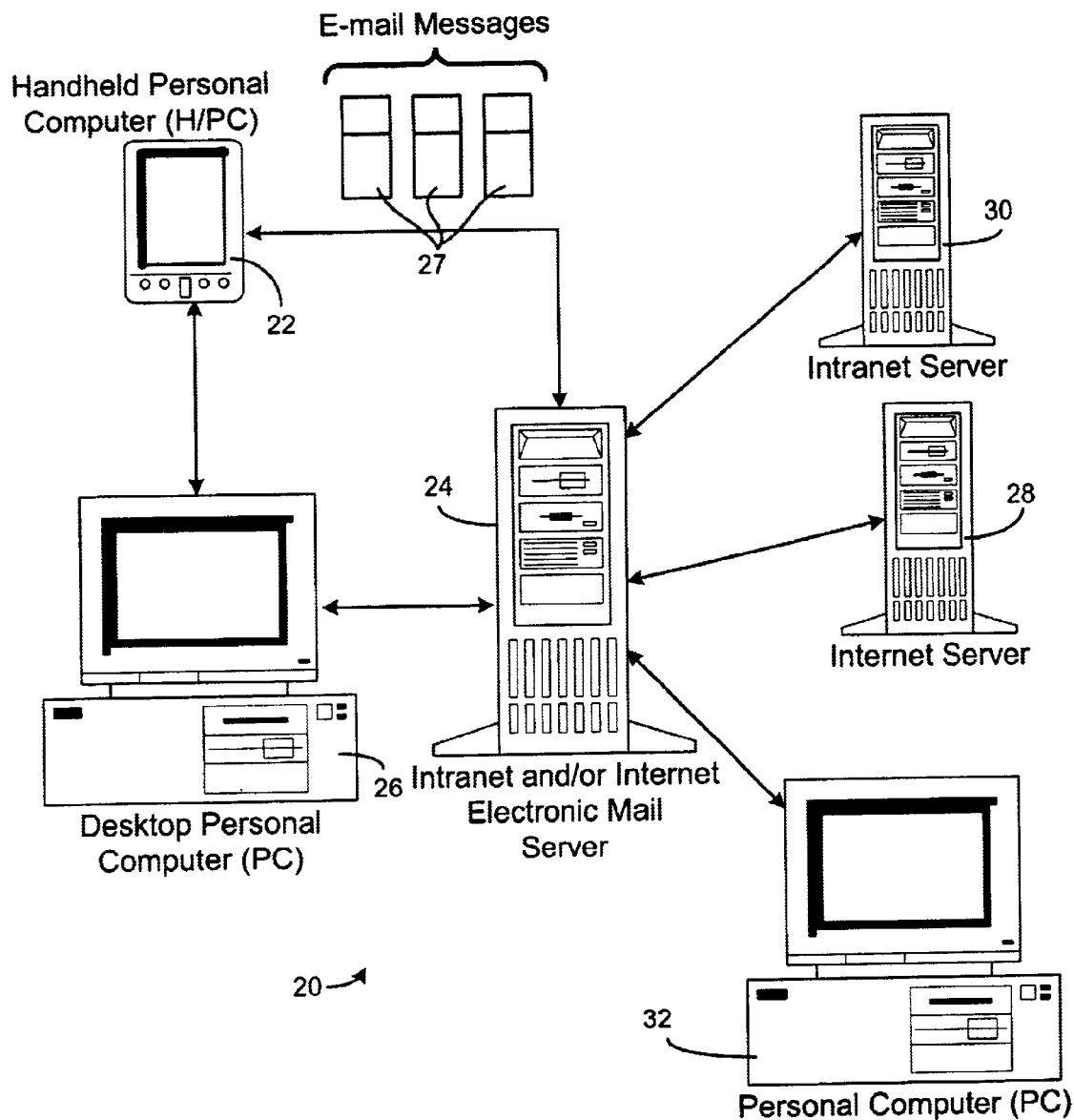
FIG. 1 is a pictorial representation of an exemplary client/server computer network environment in which the principles of the present invention may be applied.

In order to describe the present invention, example environments in which the invention may be employed are described in connection with FIGS. 1–3. FIG. 1 illustrates an example client/server network environment in which the principles of the present invention may be applied. The client/server network system 20 includes a client computer system 22 that may be connected to a server computer system 24. In one embodiment, the client computer system 22 is a portable handheld personal computer. Examples of handheld computers in which the present invention may be implemented include those that are commercially available as Handheld PCs (or H/PC), Palm-size PCs, and the like. The present invention is described in connection with handheld or other portable computers, as the invention is particularly useful when used in connection with these devices. However, the invention may be used in connection with other computing devices requiring synchronization, as will become readily apparent to those skilled in the art from the ensuing description of the invention.

The H/PC 22 may also be connected to a desktop personal computer (PC) 26 as a companion device, which in turn may be connected to the server 24. The server 24 represents a computing system capable of managing network traffic spanning various geographic areas (e.g., local, wide and global area networks) or operating under any particular network configuration. In the example of FIG. 1, the server 24 operates as an Internet server and/or an Intranet server to send and receive electronic items, such as electronic mail messages (e-mail) 27. These electronic items may be routed through various connections or gateways to other computer systems, such as an Internet e-mail server 28, an Intranet server 30 and/or another desktop PC 32. The server 24 receives email messages from the other computing systems 28, 30 and 32 and stores these e-mail messages for the user of the H/PC 22 and the PC 26 in an account dedicated to that user.

The e-mail server communicates with the various computers 22, 26, 28, 30 and 32 using specific protocols, i.e., rules governing the type and form of communications. The e-mail server may communicate with the handheld computer 22 using, for example, the Post Office Protocol (POP), the Internet Message Access Protocol (IMAP), or some other message transport protocol. POP is relatively rudimentary and offers few operational features to the user. IMAP offers more features related to the communication between a client device and the network server device. POP and IMAP protocols are considered message receipt protocols used to allow a remote or companion device to receive messages, while the Simple Mail Transfer Protocol (SMTP) is an example of a protocol used to communicate messages from the remote or companion device to the server. The present invention may be used in connection with various transfer protocols, and while some embodiments are generally described in connection with IMAP, the folder synchronization embodiment of the invention is applicable to any transfer protocol supporting multiple folders.

The handheld computer 22 includes a messaging system that receives and stores server-based items, such as the e-mail messages 27. These server-based items are stored in a hierarchy of folders, where each top-level folder of the hierarchy is associated with the user account on the server that provides the corresponding server-based items. The messaging system is capable of handling messages in flat folder storage architectures as well as the newer hierarchical folder storage architectures.

Figure 2:
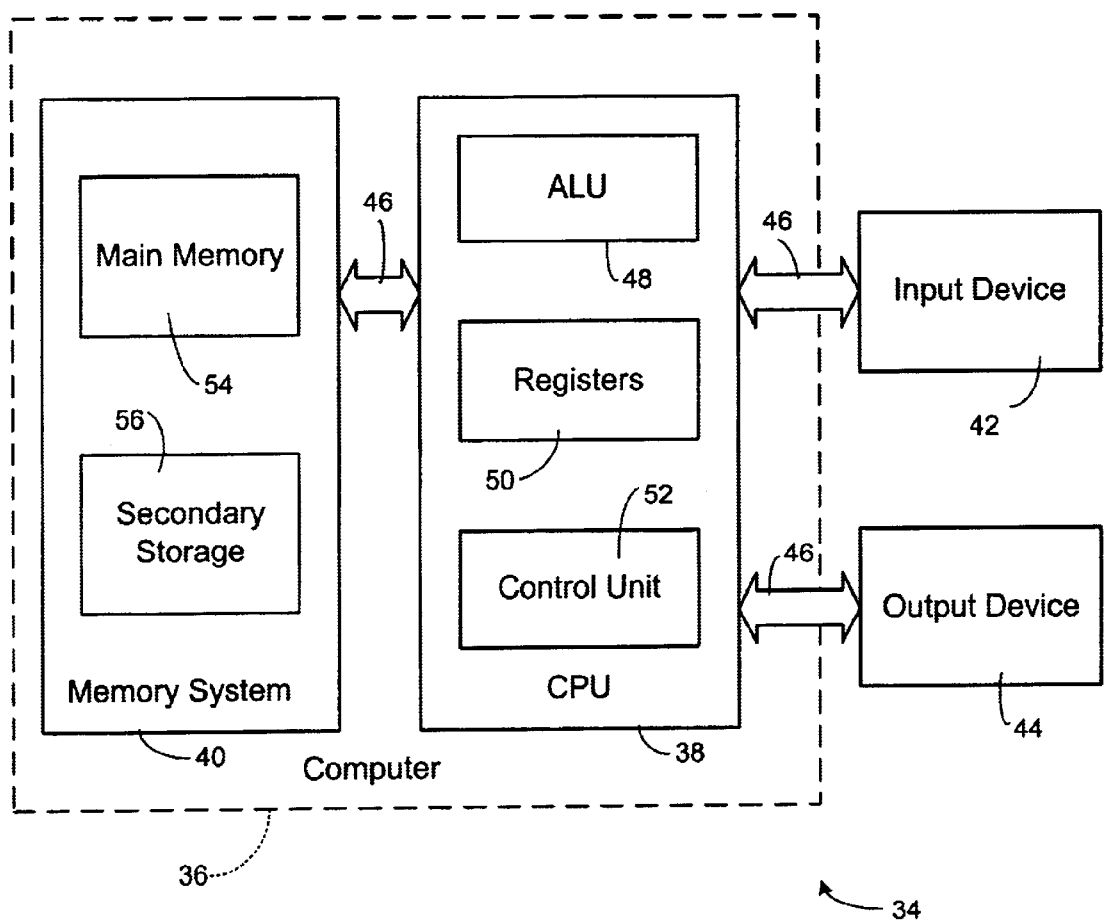
FIG. 2 shows one embodiment of a handheld computer system that may be used in connection with the present invention.

FIG. 2 provides a general description of an example computing environment in which the invention may be implemented. Various embodiments of the invention may be implemented by executing program instructions in this type of computing environment, such as the H/PC 22. Those skilled in the art will appreciate that the invention may be practiced with other computer system configurations, such as laptop PCs, desktop PCs, multiprocessor systems, microprocessor-based or programmable consumer electronics, network PCs, mini-computers, mainframe computers, and so forth.

The computing system 34 (e.g., H/PC) illustrated in FIG. 2 includes a computer 36 having at least one central processing unit (CPU) 38 with a memory system 40, an input device 42, and an output device 44. These elements are coupled by at least one system bus 46. The system bus 46 may be any of several types of bus structures such as a memory bus, a peripheral bus or a local bus using any of a variety of bus architectures. The CPU 38 is of familiar design and includes an Arithmetic Logic Unit (ALU) 50 for performing computations, a collection of registers for temporary storage of data and instructions, and a control unit 52 for controlling operation of the system 34. The CPU 38 may be a microprocessor having any of a variety of architectures including, but not limited to those architectures currently produced by Intel, Cyrix, AMD, IBM and Motorola.

The system memory 40 includes a main memory 54, which may include both volatile and non-volatile memory, such as random access memory (RAM) and read-only memory (ROM). The system memory 40 may also include secondary storage 56 in the form of long-term storage mediums such as hard disks, floppy disks, tape, compact disks (CDs), flash memory, and other devices that store data using electrical, magnetic, optical or other recording media. The main memory 54 may also include video display memory for displaying images through the output device 44, such as a display device. The memory can comprise a variety of alternative components having a variety of storage capacities such as magnetic cassettes, memory cards, video digital disks, Bernoulli cartridges, random access memories, read-only memories and the like may also be used in the exemplary operating environment. Memory devices within the memory system and their associated computer readable media provide non-volatile storage of computer readable instructions, data structures, programs and other data for the computer system.

The input devices may include a keyboard, a mouse, a microphone, a touch pad, a touch screen, voice-recognition system, etc. The output devices may include a display, a printer, a speaker, a touch screen, etc. Some devices, such as a network interface or a modem can be used as input and/or output devices. The input and output devices are connected to the computer through system buses 46.

The computer system further includes an operating system and usually one or more application programs. The operating system comprises a set of programs that control the operation of the system 34, control the allocation of resources, provide a graphical user interface to the user and includes accessory and utility programs. An example of an operating system that can run on the handheld computer is the "WINDOWS CE" operating system, which also is commercially available from Microsoft Corporation. An application program is software that runs on top of the operating system software, and uses computer resources made available through the operating system to perform application-specific tasks desired by the user. While the present invention may be integrated into the operating system software, a preferred embodiment provides for its implementation in an application program as described more fully in connection with FIG. 3 below.

Figure 3:
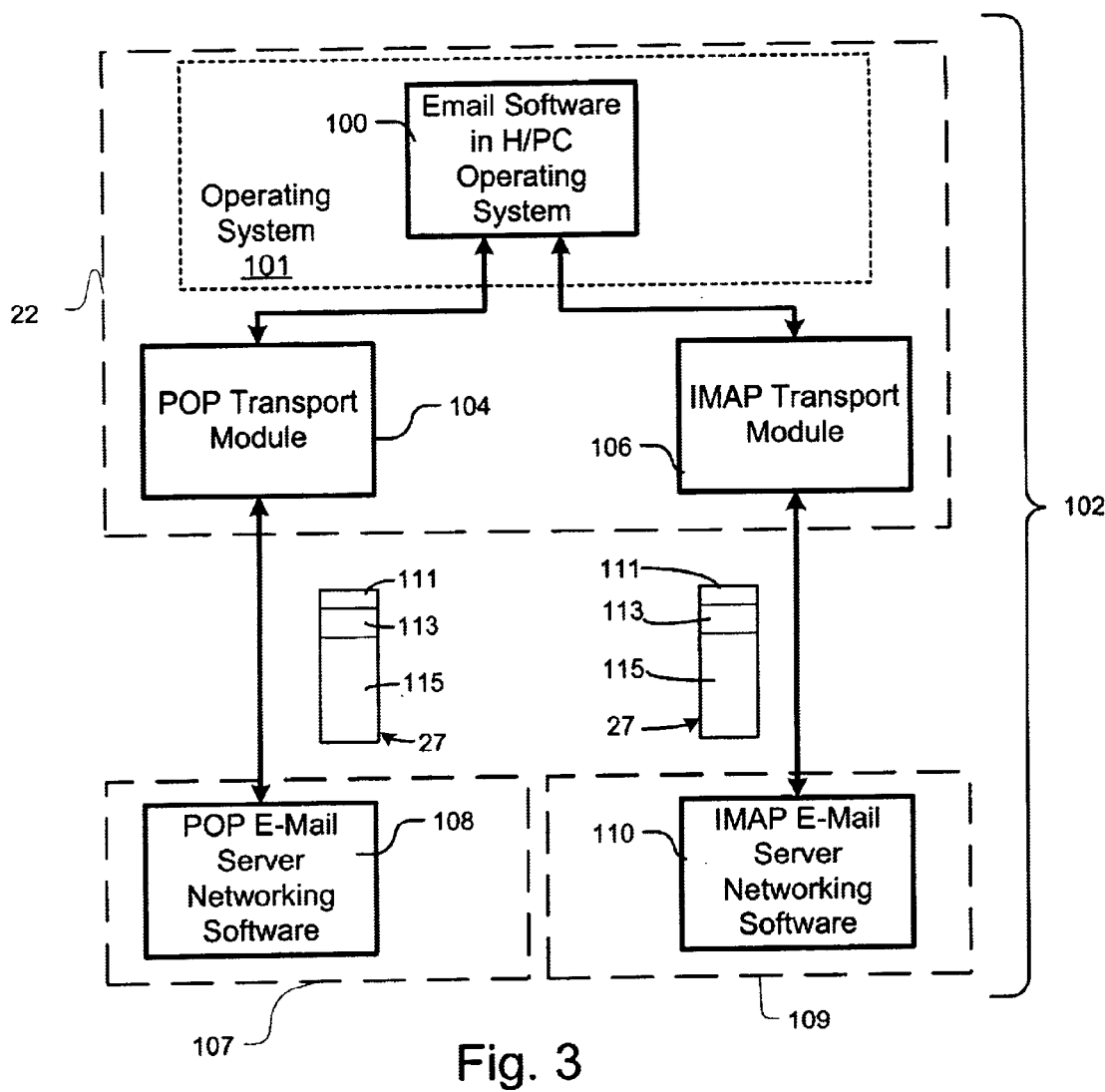
FIG. 3 shows one embodiment of a client/server software environment that includes e-mail software and transport modules capable of use in connection with the present invention.

FIG. 3 illustrates a software interface between the operating system and application programs and modules, in accordance with one embodiment of the present invention. In this embodiment, the e-mail software 100 is an application program that runs on top of an operating system 101, such as the Microsoft "WINDOWS CE" operating system used with the H/PC 22. The e-mail software 100 works directly with communication software known as transport modules. In the illustrated embodiment, one module is a POP transport module 104, and another is an IMAP transport module 106. The POP transport module 104 is a network communications layer designed specifically to communicate with POP communications software 108 located on a POP e-mail server 107. POP server 107 represents a particular embodiment of the server 24 described in connection with FIG. 1. Alternatively, the e-mail software 100 communicates with the IMAP transport module 106, which is a network communication layer designed to communicate with IMAP software 110 on the IMAP e-mail server 109. IMAP server 109 represents another embodiment of the server 24. Depending on whether the H/PC 22 is configured to communicate with server 107 or 109, transport module 104 or 106 is used. The user configures the H/PC 22 to communicate based on the user's particular e-mail account and the protocol employed by the e-mail server. However, with respect to the email software 100, the requests, commands and responses are the same regardless of which transport module (104 or 106) is used.

The e-mail software 100 sends command requests to the transport module 104 or 106 requesting that actions be performed by the server 107 or 109. Such actions might be to return server-based items such as e-mail messages. When a request is received by the module 104 or 106, the module 104 or 106 converts the command into data signals that are sent to the e-mail server 107 or 109 over the network connection. The e-mail server 107 or 109 and its networking software 108 or 110 receives these data signals, compiles the signals, analyzes the signals and performs the requested operations in response to the signals. Once the server 107 or 109 performs the operations, the server returns information to the transport module 107 or 109 either acknowledging the operation was completed successfully, or that an error occurred.

The response from the server also includes data requested by the software 100. The response is in the form of data signals that are sent to the module 104 or 106. Module 104 or 106 in turn compiles the data signals into a meaningful response for transport to the e-mail software 100. The software 100 can then parse and use the response accordingly.

The subjects of the requests from the software 100 to the server 107 or 109 relate to e-mail messages 27 (FIG. 1). Each e-mail message 27 is an electronic document that is made up of at least three elements: an identification element (ID) 111; header information 113; and a message body 115. The ID 111 is used internally by the handheld computer 22 or the server 24 to identify the file. It may be a simple identifier such as an integer, or may be more complex such as a file name or other ID string. The header 113 includes information regarding the e-mail message 27, such as the originator, addressee, creation time, and message subject. The header 113 may include other informational fields relating to the data or management thereof. The body 115 is the actual message created by the message originator, and may include text, graphics, other files or attachments.

In the following description, the logical operations of the various embodiments of the invention described herein may be implemented in a variety of manners, including a sequence of computer implemented steps running on a computing system, and/or interconnected machine modules within the computing system. The particular implementation used is a matter of choice dependent on the performance requirements of the handheld computer and/or the server. Accordingly, the logical operations making up the embodiments of the invention are referred to alternatively as operations, steps or modules.

Figure 4:
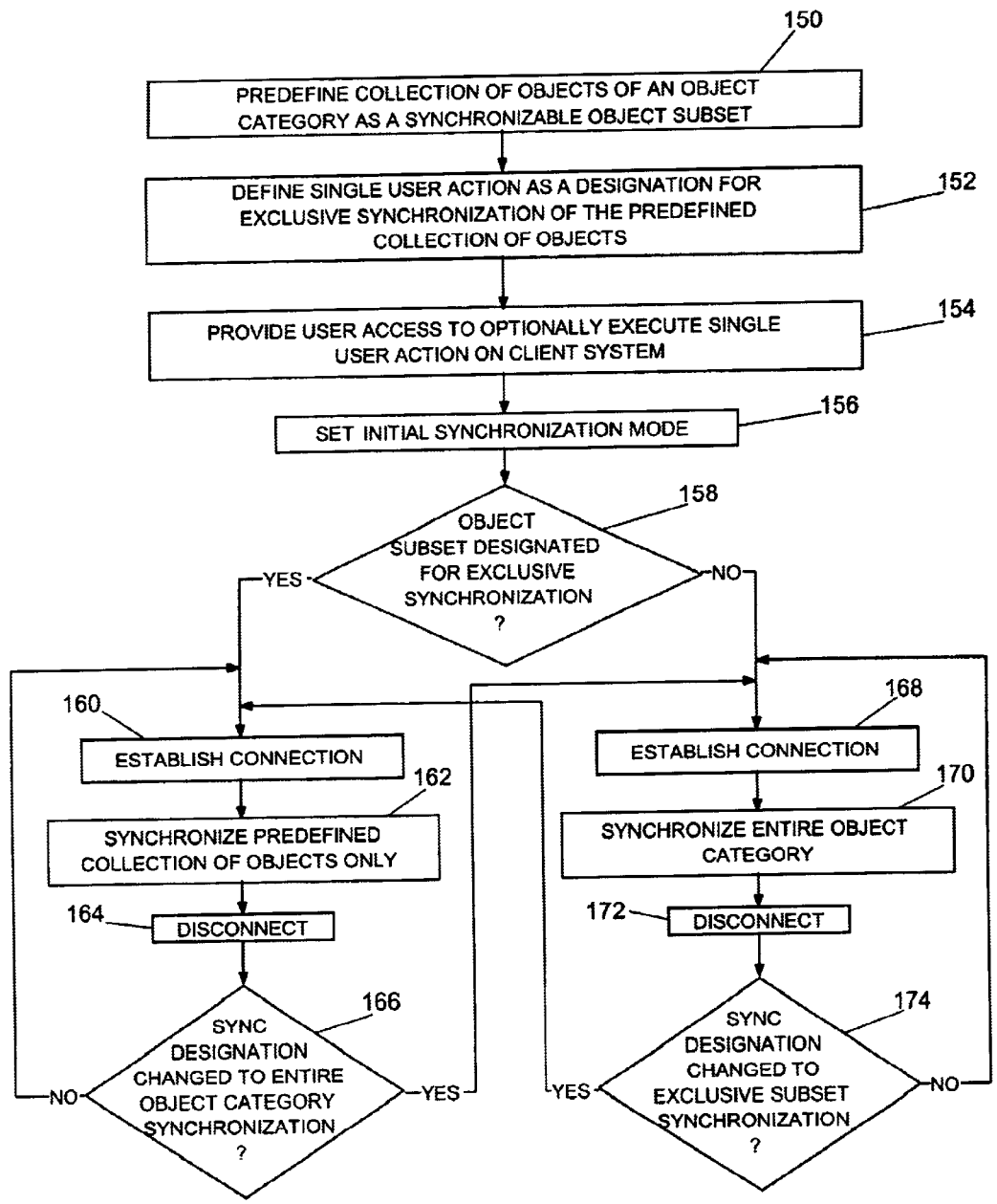
FIG. 4 is an operation flow diagram illustrating one manner of selectively designating particular subsets of information for synchronization in accordance with the principles of the present invention.

FIG. 4 is an operations flow diagram illustrating one manner of selectively designating particular subsets of information for synchronization in accordance with the principles of the present invention. A predetermined collection of information or objects is defined as a subset of a complete information category as shown at definition operation 150. The information category includes information that may be synchronized between two or more computing systems, such as e-mail folders of a folder hierarchy or certain documents in a file directory. A particular subset of this information set is identified as selectable collection of information worthy of synchronization, to the exclusion of the remaining information in the information set.

A single user action is defined by operation 152 to facilitate designation of the subset of information for exclusive synchronization. A "single" user action indicates that only one selectable function need be executed by the user in order to cause the synchronization of the predefined subset of information. The user is provided access by operation 154 to execute this single user action on the client/companion system. For example, in one embodiment of the invention, a graphical user interface (GUI) is provided, which allows the user access to a graphical toggle selector. Other user interfaces are equally feasible, including keystroke or text entry, voice-activated input, touch screens, etc. As will be described further below, performing this predefined user action via the supplied user interface determines which plurality of information objects will be made available for synchronization.

The synchronization mode is initially set by operation 156. The synchronization mode selected depends on whether the user has performed the predefined user action. For example, in a first synchronization mode, a subset of the information is identified for synchronization if the user has performed the predefined user action via the user interface. Otherwise, a second synchronization mode controls synchronization, whereby all of the information in the information set is available for synchronization. The initial synchronization mode may be explicitly set by the user by executing the predefined user action, or alternatively a synchronization mode can be assigned by default such that no action on the user's part results in one mode or the other governing initial synchronization. In one embodiment of the invention, a default mode is used where all of the information in the information set is available for synchronization, unless and until the user performs the predefined user action.

Decision operation 158 determines whether the information/object subset has been designated for exclusive synchronization by the user—i.e., whether the user has performed the single predefined user action which authorizes only the subset of the complete information set to be synchronized. If so, the next time a connection is established at operation 160, synchronization operation 162 will synchronize only the object subset, rather than the entire object set. After the user has terminated the connection between the client system and primary/server system as shown at disconnect operation 164, further client system use by the user may result in changing the synchronization mode. Decision operation 166 determines whether the synchronization mode has been changed by the user to authorize synchronization of the entire object category (e.g., the full information set) on subsequent connections. If not, operation flow branches NO to connection operation 160, where the object subset will continue to be the only information permitted to be synchronized on subsequent connections. If decision operation 166 determines that the synchronization mode has been changed by the user to authorize synchronization of the entire object category, it indicates that the user no longer wants only the information "subset" to be synchronized, but rather will permit synchronization of the entire object category. The operation flow branch YES from decision operation 166 illustrates this determination, and where the synchronization mode has been changed and a connection has been established as indicated at operations 166 and 168, the entire object category will be available for synchronization by operation 170.

After the user has terminated the connection between the client system and primary/server system via operation 172, further client system use by the user may result in changing the synchronization mode. Decision operation 174 determines whether the synchronization mode has been changed by the user to authorize synchronization of only the predefined object subset. If not, operation flow branches NO to connection operation 168, where the entire object category will continue to be available for synchronization on subsequent connections. If decision block 174 determines that the synchronization mode has been changed by the user to authorize synchronization of only the predefined object subset, this indicates that the user no longer wants to synchronize all of the information, but rather wants to synchronize only the predefined object subset. Therefore, where decision operation 174 determines that the synchronization mode has been changed, and where the connection operation 160 has established a connection, only the predefined collection of objects will be synchronized by synchronization operation 162. In this manner, the user can collectively include or exclude a plurality of synchronizable objects from the synchronization process, while requiring only a single user-interface action to do so.

Figure 5:
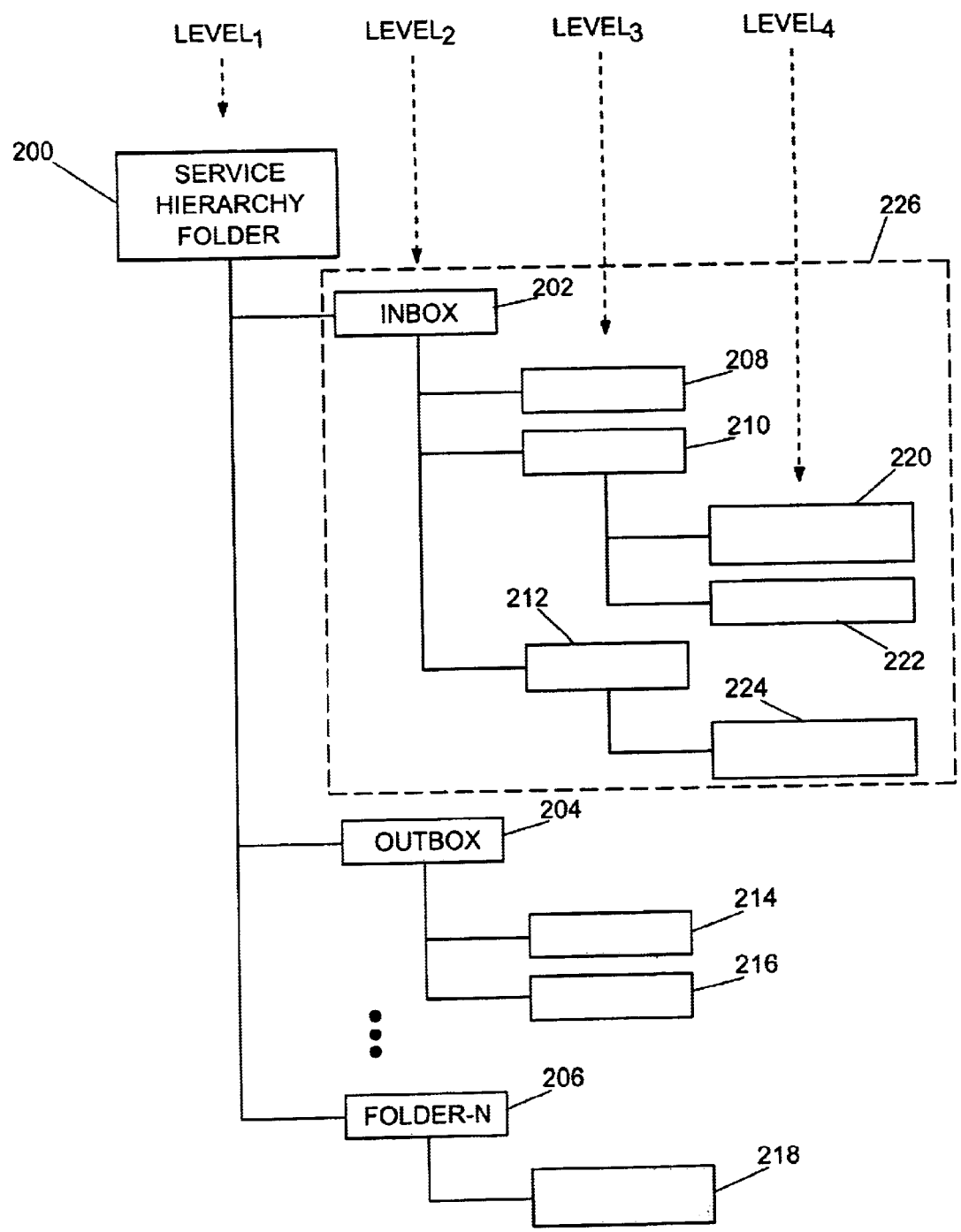
FIG. 5 illustrates an example of an e-mail folder hierarchy in which e-mail messages may be organized.

In accordance with one embodiment of the invention, the client or "companion" device is a handheld computer that functions as an e-mail client, which facilitates e-mail operations such as sending, receiving and organizing electronic mail messages. FIG. 5 illustrates an example of an e-mail folder hierarchy in which e-mail messages may be organized at the server computing system. As will be described in greater detail below, a predetermined subset of such a hierarchy can be collectively included in the synchronization process in accordance with the principles of the present invention.

Referring now to the example folder hierarchy of FIG. 5, a service hierarchy folder, labeled Service Hierarchy Folder 200, represents a root or top-level folder. Each service through which the handheld computer can connect to the server will have its own hierarchy. For example, for a particular connection, the Service Hierarchy Folder 200 would be labeled as a "Service Name" folder. Some transports may be grouped together into a single service hierarchy folder, such as one labeled "Mailbox". The folder 200, representing a first-level or "$Level_1$" folder, may include one or more subfolders, shown as Inbox 202, Outbox 204 through Folder-N 206 at $Level_2$ of the folder hierarchy. In this example, each of the folders 202, 204, 206 have associated subfolders at $Level_3$, including folders 208, 210, and 212 as subfolders of the Inbox folder 202; folders 214 and 216 as subfolders of the Outbox folder 204; and folder 218 as a subfolder of Folder-N 206. Similarly, $Level_4$ subfolders include folders 220, 222, and 224. The folder hierarchy may contain further hierarchy levels as defined by the user.

The folder hierarchy illustrated in FIG. 5 represents a typical hierarchy that is created by the user on a server or desktop computer. When the user connects a companion device (such as an H/PC) to the server or desktop computer, either a predefined subset of the hierarchy, or the entire set of folders, may be synchronized between the two systems in accordance with the principles of the present invention. For example, all of the folders associated with the Service Hierarchy Folder 200 may be synchronized (e.g., folders 202–224), or alternatively a predefined subset may be synchronized. An example of such a predefined subset is the Inbox branch 226 of the folder hierarchy. The present invention allows the user to select between synchronizing all folders associated with the Service Hierarchy Folder 200 or synchronizing a predefined subset such as the Inbox branch 226, using a single selection mechanism rather than requiring the individual designation of particular folders to be synchronized. Folders that are synchronized are thereby made available on the H/PC.

Figure 6:
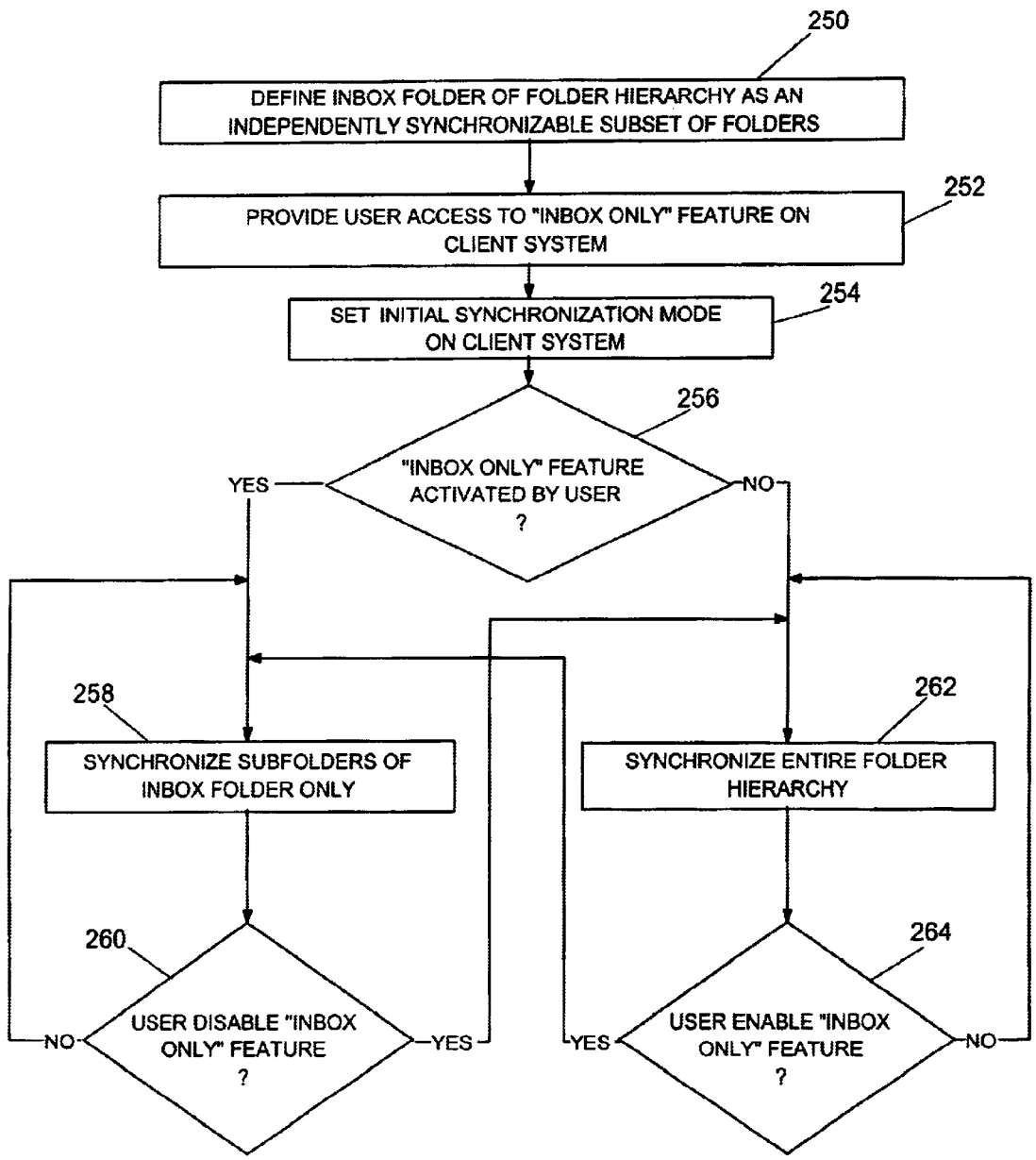
FIG. 6 is an operation flow diagram illustrating one embodiment for selectively limiting synchronization to a predetermined subset of e-mail folders in a folder hierarchy in accordance with the present invention.

FIG. 6 is an operation flow diagram illustrating one embodiment for selectively limiting synchronization to a predetermined subset of e-mail folders in a folder hierarchy in accordance with the present invention. In this example embodiment, definition operation 250 defines the Inbox folder of the folder hierarchy and all folders descending from it as an independently synchronizable subset of folders. The user is provided access to an "Inbox Only" feature on the client/companion system as shown at operation 252. Mode set operation 254 sets the initial synchronization mode on the client system, and can be explicitly set by the user, or alternatively may be preset to a default synchronization mode. In one embodiment, the initial synchronization mode is set by default to allow synchronization of the entire folder hierarchy.

Decision operation 256 determines whether the "Inbox Only" feature has been activated by the user. If so, operation flow branches YES to synchronization operation 258, where only the subfolders descending from the Inbox folder are synchronized. If the user subsequently disables the "Inbox Only" feature on the companion device as determined at decision operation 260, operation flow branches YES to synchronization operation 262, which results in synchronizing the entire folder hierarchy at the next server/client connection. Otherwise, operation flow branches NO from decision operation 260 back to synchronization operation 258, such that subsequent synchronizations will continue to synchronize only the subfolders associated with the Inbox folder branch.

If, on the other hand, decision operation 256 determines that the "Inbox Only" feature has not been activated by the user, operation flow branches NO to synchronization operation 262, where the whole folder hierarchy is available for synchronization. If decision operation 264 determines that the user subsequently enables the "Inbox Only" feature on the companion device, operation flow branches YES to synchronization operation 258, where subsequent synchronizations will result in synchronizing only the subfolders associated with the Inbox folder. If decision operation 264 determines that the user has not enabled the "Inbox Only" feature, operation flow branches NO back to synchronization operation 262, where subsequent synchronizations will continue to synchronize all of the folders in the folder hierarchy. As can be seen in FIG. 6, the activation state of the "Inbox Only" feature allows alternate "groups" of folders to be synchronized by control of a single user-interface feature.

Figure 7:
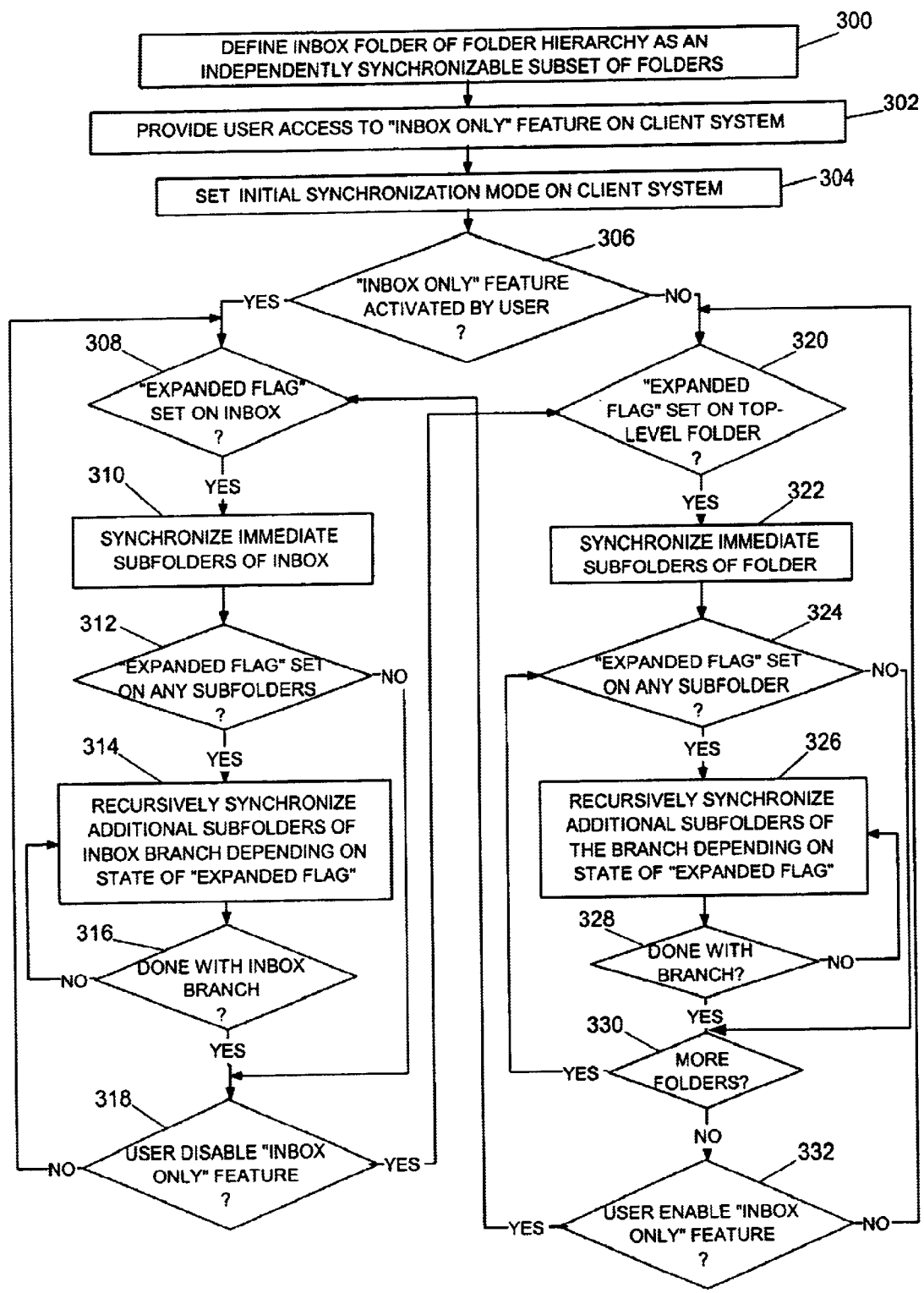
FIG. 7 is an operation flow diagram illustrating one embodiment for selectively limiting synchronization to a predetermined subset of e-mail folders in a folder hierarchy, and for further limiting unnecessary folder synchronization through execution of a second, overlapping synchronization operation.

FIG. 7 is an operation flow diagram illustrating one embodiment for selectively limiting synchronization to a predetermined subset of e-mail folders in a folder hierarchy, and for further limiting unnecessary folder synchronization through the integral execution of a second level of synchronization. In this embodiment, two synchronization operations cooperatively overlap to provide both an explicit designation of a group of folders/subfolders to synchronize, and a designation of folders/subfolders within that group that are implicitly deemed to be of interest to the user.

Definition module 300 defines the Inbox folder of the folder hierarchy and all folders descending from it as the independently synchronizable subset of folders. Access module 302 provides the user access to the "Inbox Only" feature on the client/companion system, and mode set operation 304 sets the initial synchronization mode on the client system. As was described in connection with FIG. 6, the initial synchronization mode can be explicitly set by the user, or alternatively may be preset to a default synchronization mode.

At decision operation 306, it is determined whether the "Inbox Only" feature has been activated by the user. If so, operation flow branches YES, to ultimately allow only the subfolders descending from the Inbox folder to be among the group authorized for synchronization. However, it may be desirable to further limit the number of folders synchronized within the permitted group, without requiring any further explicit designations of folders to be synchronized. In the embodiment described in connection with FIG. 7, this further limitation of folder synchronization is based on the implicit perception of the user's desire to synchronize certain folders and without the need for further explicit designation by the user. The selective synchronization based on implicit user designation may be determined in a manner described in connection with FIG. 7, and in copending U.S. patent application, Ser. No. 09/407,543, now U.S. Pat. No. 6,505,214 which issued on Jan. 7, 2003, entitled "Selective Information Synchronization Based On Implicit User Designation," filed concurrently herewith and assigned to the assignee of the instant application, the contents of which are incorporated herein by reference.

Returning to FIG. 7, operations 308, 310, 312 and 314 generally depict the second synchronization selection operation. When decision block 306 determines that the user has activated the "Inbox Only" feature, operation flow branches YES to decision operation 308 where it is determined whether an "expanded flag" associated with the Inbox folder is set. An "expanded flag" is set in a local folder database of the companion device for each folder/subfolder that is to be synchronized. It is the state of this "expanded flag" that is monitored in the illustrated embodiment of FIG. 7. The flag can be "set" to any binary value, code, or other indicator, and in one embodiment, the "flag" is a binary value, which is set to a predetermined state when synchronization is to take place. In one embodiment, the expanded flag is set for subfolders of a folder that appears to be of interest to the user, which is implicitly determined when the user activates (e.g., "taps" or "clicks") an expansion icon for that folder in the user interface (UI). Activating the expansion icon of a folder causes that folder's subfolders to be displayed to the user, thereby implicitly revealing the user's interest in those subfolders, and therefore the user's implicit desire to synchronize those folders. When the user "expands" a folder (e.g., by tapping or clicking on the folder expansion icon), the expanded flag is set for this folder, which indicates that subfolders of this folder are to be synchronized on a subsequent server connection.

If the expanded flag associated with the Inbox folder is set, and operation flow is directed to synchronization operation 310. Synchronization operation 310 identifies the immediate subfolders of the Inbox folder for synchronization at the next connection to the server. The state of the expanded flag is then determined at decision operation 312 for the next-level subfolders of the Inbox folder. If decision operation 312 determines that none of the subfolders have an expanded flag set, no further subfolders of the Inbox folder will be synchronized, and operation flow branches NO to decision operation 318. If decision operation 312 determines that an expanded flag is set on the Inbox folder, operation flow branches YES to operation 314 where each of the subfolders of the Inbox folder having a set expanded flag is recursively synchronized until the Inbox branch synchronization is complete. Whether the recursive synchronization is complete is determined at decision operation 316. For example, if at decision operation 312 it is determined that the expanded flag is set on the Inbox folder 202 of FIG. 5, the Level$_3$ Folders 208, 210 and 212 that are immediate subfolders of the Inbox folder 202 will be synchronized. The recursive process continues down the Inbox branch 226 to Level$_4$ and further, if necessary, to synchronize all subfolders of the folders having an expanded flag set.

A mail store is provided in the client device, and includes two separate databases: a message database, and a folder database. These two databases house the data records representing both the message and folder data within the user-defined, hierarchical folder architecture. In one embodiment of the invention, the expanded flag represents a field of the folder database in each database record.

When the Inbox branch has been synchronized in accordance with the state of the expanded flags, decision operation 318 determines whether the user subsequently disables the "Inbox Only" feature on the client/companion device. If the user does not disable the "Inbox Only" feature, operation flow branches NO from decision operation 318 back to decision operation 308, which illustrates that further synchronizations will continue to be prohibited for folders external to the Inbox branch. If the user does disable the "Inbox Only" feature, operation flow branches YES to the operation flow starting at decision operation 320, where subsequent synchronizations within the entire folder hierarchy will be permitted depending on the state of the expanded flags. Decision operation 320 determines the state of the expanded flag for the top-level folder, and if set, synchronization operation 322 synchronizes the immediate subfolders of that folder at the next server connection.

Decision operation 324 determines the state of the expanded flag for the next-level subfolders of that folder. If the expanded flag is not set, no further subfolders for that folder will be synchronized, and operation flow branches NO to decision operation 330. Decision operation 330 determines whether there are more folders to consider. Where expanded flags having a set state are detected at decision operation 324, subfolders of each corresponding folder are recursively synchronized by synchronization operation 326 until the folder hierarchy synchronization is complete. Hierarchy synchronization completion is determined by decision operations 328 and 330.

When the folder hierarchy has been synchronized in accordance with the state of the expanded flags, decision operation 332 determines whether the user subsequently enables the "Inbox Only" feature on the companion device. If decision operation 332 determines that the user has not enabled the "Inbox Only" feature, operation flow branches NO back to decision operation 320, which illustrates that further synchronizations will continue to be allowed for folders external to the Inbox branch. If decision operation 332 determines that the user has enabled the "Inbox Only" feature, operation flow branches YES to decision operation 308. The operation flow associated with decision operation 308 is associated with an active "Inbox Only" feature, such that subsequent synchronizations within the entire folder hierarchy will not be permitted. Decision operation 308 determines the state of the expanded flag for the Inbox folder, and if set, synchronization operation 310 synchronizes the immediate subfolders of the Inbox folder at the next server connection. In this manner, the user can first explicitly exclude (with a single user input designation) all folders of the folder hierarchy outside of the Inbox folder, and the system can then synchronize only those folders within the selected group that implicitly appear to be of interest to the user.

The operations involved in determining which information is to be synchronized include actually synchronizing that information between systems. For example, operations 310 and 322 of FIG. 7 identify the general synchronization operation for subfolders between the client and server. The present invention is not dependent on any particular manner of performing the actual synchronization between the two synchronizing systems, and the present invention may be implemented with any desired synchronizing algorithm. Therefore, while an exemplary information synchronization method is described in connection with FIG. 8, those skilled in the art will readily appreciate that the present invention is clearly not limited to any particular synchronization operation.

Figure 8:
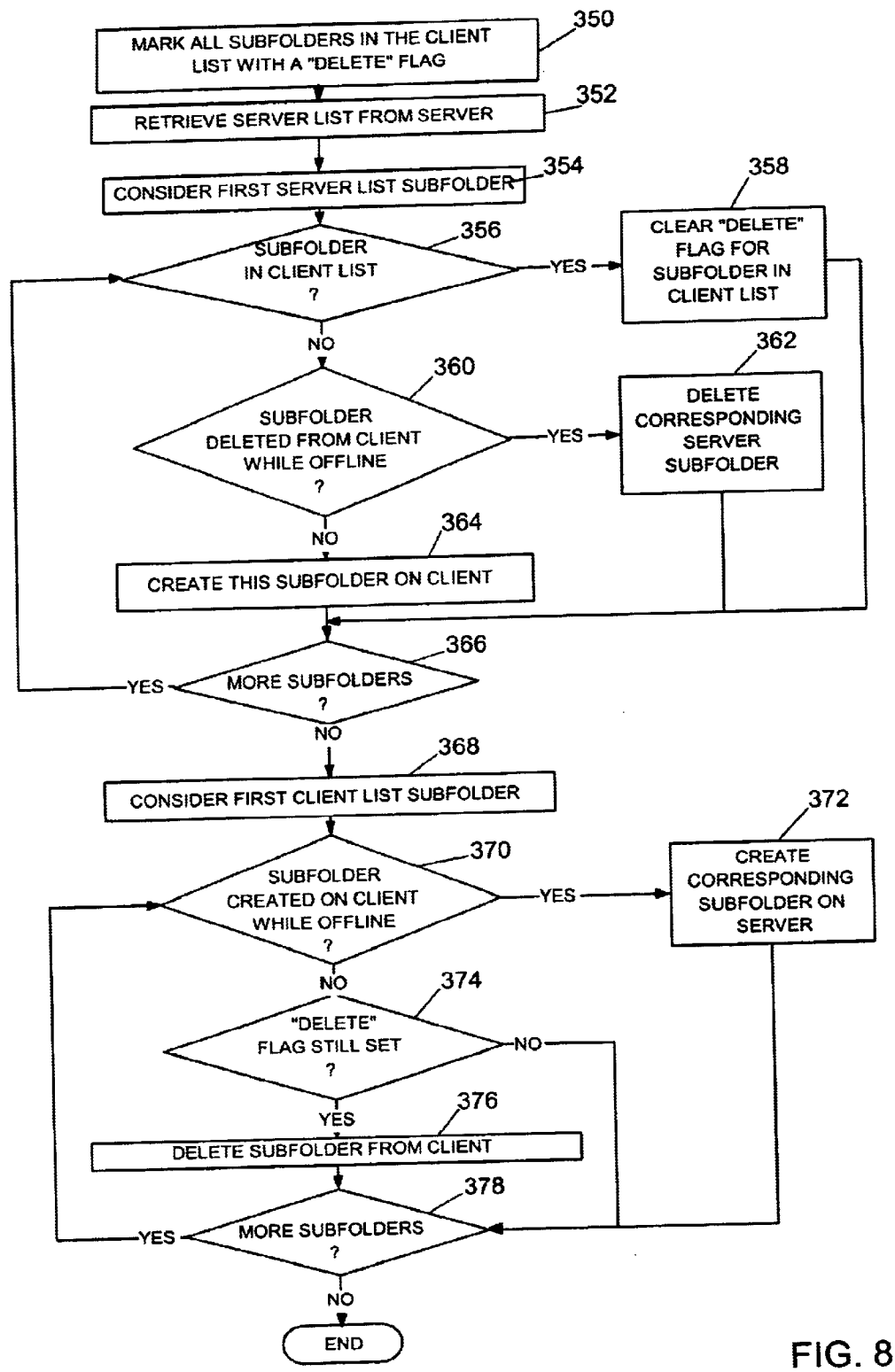
FIG. 8 is an operation flow diagram illustrating the synchronization of portions of an e-mail folder hierarchy between multiple computing systems.

Referring now to FIG. 8, logical operations for synchronizing information, particularly an e-mail folder hierarchy, are illustrated. The synchronization operations synchronize subfolders of a particular folder; however they will do so only to the folders and subfolders designated in accordance with the principles of the present invention. In this example, the synchronization operation works in connection with two folder lists—a server subfolder list, and a client subfolder list. The server list is a list of folders/subfolders currently recognized by the server as being part of the folder hierarchy. The client list is the list of folders/subfolders currently recognized by the client/companion device as being part of the folder hierarchy. The server and client lists correspond to stored records or objects, each potentially including a plurality of fields or properties, one of which is a subfolder identification in the case of folder objects. These objects are stored in an object store (such as a mail store) in each respective computer system. The exemplary synchronization operation flow of FIG. 8 uses the server and client lists to determine folder/subfolder discrepancies between the systems, and synchronizes the lists accordingly. While the term "subfolders" is used in connection with FIG. 8, it should be noted that this term includes folders or subfolders. The synchronization algorithm shown in FIG. 8 synchronizes subfolders of one given folder and is executed for every folder having subfolders that are to be synchronized.

The synchronization operations of FIG. 8 are carried out on the client. All subfolders in the client list are marked by mark operation 350 with an identifying flag, hereinafter referred to as the "delete flag." The delete flag provides an indication as to what subfolders were present in the device list at the outset of synchronization. As will become more apparent from the ensuing description, this flag is used to ultimately direct the client to delete a particular subfolder that has been deleted from the server since the last connection.

A server list synchronization loop is then performed. Retrieving operation 352 retrieves the server list from the server. In one embodiment, the top-level folder (e.g., Service Hierarchy Folder 200 of FIG. 5) does not exist on the server and only exists on the client, and therefore will not be "retrieved" from the server list. All other subfolders associated with that particular service will exist on the server, and will be downloaded as part of the server list. A first subfolder of the server list is recognized by operation 354, and operation 356 determines whether that subfolder is in the client list. If so, operation 358 clears the delete flag in the client list. To "clear" the delete flag simply means to "unset" the delete flag that was initially set, and does not suggest or require any particular binary value or code. Any predetermined values may be used as to identify the "set" or "clear" conditions. Essentially, clearing the delete flag indicates that the server list subfolder is present on the client, and should not be deleted from the client because it is present on the server. Once the delete flag has been cleared in the client list, operation 366 detects whether there are more subfolders in the server list to consider, and if so, operation flow returns to decision operation 356 where the next subfolder in the device list is considered.

It should also be noted that discrepancies in subfolder names may be resolved at this point as well. Since each of the subfolders are identified by a subfolder ID rather than the descriptive UI name, the operation can identify corresponding subfolders in the server and device lists even though the UI names are different. In these cases, the subfolder name will be modified in accordance with a predetermined naming convention so that they correspond with one another. In one embodiment, this naming convention involves resolving name conflicts by adopting the subfolder name in the server list.

If operation 356 detects that the particular subfolder of the server list is not present in the client list, operation 360 determines whether that subfolder was deleted from the client while offline (i.e., not connected to the server) since the last connection. If so, that subfolder is deleted from the server list by operation 362, as deletion of the subfolder from the device indicates the user's desire to have that subfolder removed from the hierarchy. Once deleted, operation 366 detects whether there are more subfolders in the server list to consider, and if so, operation flow returns to decision operation 356 where the next subfolder in the client list is considered.

If the subfolder was not deleted from the client while offline, create operation 364 creates the subfolder on the client. A subfolder is created on the device at operation 364 because the subfolder is known to be present in the server list (i.e., operation 354 or 366), it is not present on the client (i.e., operation 356), and it was not deleted from the client since the last connection (i.e., operation 360). Therefore, to synchronize subfolders in the server and client lists, a corresponding subfolder must be created in the client list. Once created, operation 366 detects whether there are more subfolders in the server list to consider, and if so, processing returns to decision operation 356 where the next subfolder in the client list is considered.

A client list synchronization loop is then performed. A first subfolder of the client list is considered at operation 368, and operation 370 determines whether that subfolder was created on the client while offline since the last connection. When subfolders are created on the client while offline, they are marked with a special creation flag. This creation flag is checked at decision operation 370. If the creation flag indicates that the subfolder was created on the client while offline, operation 372 creates a corresponding subfolder on the server. Then, operation 378 determines whether there are more subfolders in the client list to consider. If so, processing returns to decision operation 370 where the next subfolder in the client list, if any, is considered.

If operation 370 determines that the subfolder was not created on the client while offline since the last connection, test operation 374 tests whether the "delete flag" is still set. If so, it means that subfolder was not previously found in the server list, and therefore needs to be deleted from the client list, which is accomplished by operation 376. Operation 378 determines whether there are more subfolders in the client list to consider, and if so, processing returns to decision operation 370 where the next subfolder in the device list, if any, is considered.

Figure 9:
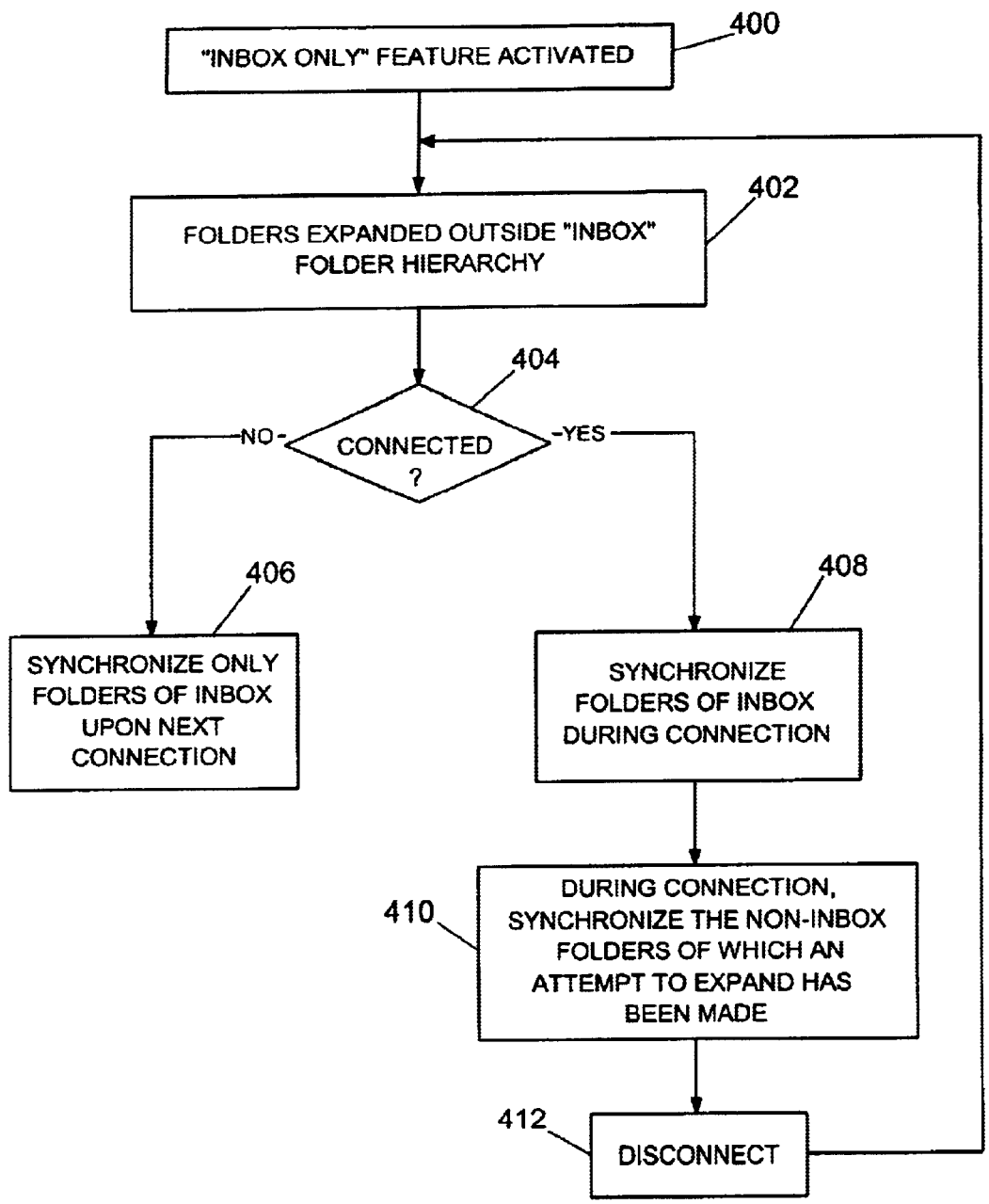
FIG. 9 is an operation flow diagram illustrating a synchronization override feature in accordance with the invention.

FIG. 9 illustrates an operational embodiment of a synchronization override feature in accordance with the invention. In this embodiment, certain folders not descending from the Inbox can be synchronized even though the "Inbox Only" feature has been activated. This override function can be used in the case where the user of a client/companion device attempts to view or otherwise use folders not descending from the Inbox while the client device is electronically connected to the server. This embodiment of the invention assumes that the user wants these particular folders to be synchronized, even though the user previously activated the "Inbox Only" feature. The override feature therefore synchronizes those particular non-Inbox folders of interest to the user during the connection, however those non-Inbox folders synchronized during the connection will not be synchronized on a subsequent connection if the "Inbox Only" feature is still activated. An example embodiment of the override feature is provided in connection with FIG. 9.

In this example, it is assumed that the "Inbox Only" feature has been activated by a user, as depicted at operation 400. The user attempts to view or otherwise use portions of the folder hierarchy situated outside of the Inbox branch, e.g., by expanding a folder outside the Inbox branch as operation 402 suggests. If decision operation 404 determines that the user is not connected at the time this action is taken, operation flow branches NO to synchronization operation 406. Synchronization operation 406 ensures that only the folders of the Inbox branch are synchronized at the time of the next server connection. If, however, decision operation 404 determines that the user is connected to the server, operation flow branches YES to synchronization operation 408. Furthermore, where the user is connected to the server, operation flow continues to synchronization operation 410, where any non-Inbox folders of which a folder expansion attempt has been made will also be synchronized. These non-Inbox folders are therefore only synchronized if the user expands a folder outside of the Inbox branch, during the time the user is connected to the server or other computing system to which synchronization is to be effected. Once the client device is disconnected from the server by disconnect operation 412, operation flow returns to operation 402. The expanded non-Inbox folders will not be synchronized upon the next connection unless the user again expands those folders during the connection. If the user does not expand the non-Inbox folders, or if the user is not connected during the attempt to expand those non-Inbox folders, synchronization will be effected by synchronization operation 406 such that only the folders in the Inbox branch will again be synchronized.

Figure 10:
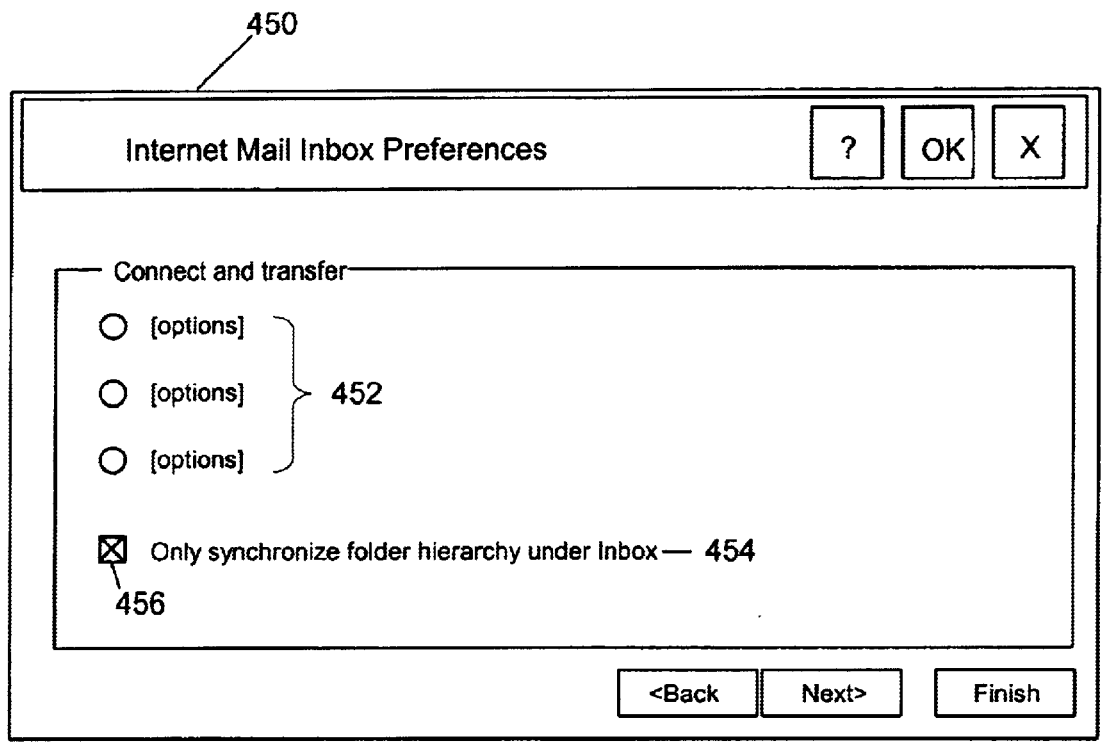
FIG. 10 depicts an example graphical user interface (GUI) service dialog screen through which the Inbox Only feature may be activated.

FIG. 10 is an illustration of an example graphical user interface (GUI) of a service dialog window 450 in which the "Inbox Only" feature may be activated. The GUI depicted in FIG. 10 is an example of the type of user access that is provided to the user to facilitate the single user action required of the user to activate the Inbox Only feature. It should be recognized that the following description is provided in terms of a GUI, those skilled in the art will readily appreciate from the ensuing description that other user interfaces are equally feasible, including text entry, voice activated input, touch screens, etc.

The service dialog window 450 is one of a plurality of user-access screens that may be presented to the user upon request. This particular user-access screen is entitled Internet Mail Inbox Preferences, and includes various selectable connection and information transfer options 452. One such option is for the "Inbox Only" feature, and in this embodiment the option label 454 is "Only synchronize folder hierarchy under Inbox." Associated with this option label is an option selection icon 456. The user activates this option by tapping in the option selection icon 456 with a graphical entry device such as a mouse. The option can also be activated via a menu structure, touch screens, voice activation or other user interface technologies. Activation of the option selection icon 456 marks the icon 456 in a manner indicating it has been selected, which in this example, is with a visible "X" in the icon 456. If the user again taps in the option selection icon 456, the Inbox Only feature will be disabled, and the option selection icon 456 will be cleared. In this embodiment, selection of the option selection icon 456 operates as an electronic toggle switch, allowing the user to select or deselect the "Inbox Only" feature as desired, yet only requiring the user to take a single action to cause one of two collections of folders to be made available for synchronization.

It will, of course, be understood that various modifications and additions can be made to the embodiments discussed hereinabove without departing from the scope or spirit of the present invention. For example, the present invention may be implemented in an operating system such as Microsoft Corporation's "WINDOWS CE", or may be implemented in other operating systems or application software such as an email software module. While many embodiments of the invention were described in terms of synchronization of e-mail folder hierarchies, the invention is not limited to such, as specific collections of synchronizable information can be similarly designated for synchronization using the principles of the present invention, such as a favorite file directory like "My Documents" a default category of Internet bookmarks, and the like. Further, the particular embodiments relating to an e-mail hierarchy are not limited to IMAP, POP or any other transport protocol described above, but rather the principles of the present invention described in connection with folder hierarchy embodiments are applicable to any transport protocol supporting multiple folders. Accordingly, the scope of the present invention should not be limited by the particular embodiments discussed above, but should be defined only by the claims set forth below and equivalents thereof.

What is claimed is:

1. A method for selectively synchronizing a subset of objects of an object set between first and second object stores, the method comprising:

defining the subset of objects as a plurality of selected objects of the object set;

receiving a selection identifier corresponding to a synchronization mode to be used for multiple subsequent synchronizing acts until receipt of a different selection identifier;

setting the synchronization mode based on the selection identifier to a first identification state or a second identification state;

synchronizing all of the objects of the object set when the synchronization mode is set to the first identification state; and synchronizing only the subset of objects and prohibiting synchronization of the objects in the object set which are not among the subset of objects when the synchronization mode is set to the second identification state.

2. The method of claim 1, further comprising changing the identification state of the synchronization mode upon toggling of the selection identifier.

3. The method of claim 1, further comprising establishing a connection between first and second computing systems prior to synchronizing any objects between the first and second object stores.

4. The method of claim 1, further comprising providing an interface for a user to enter the selection identifier.

5. The method of claim 1, wherein synchronizing all of the objects of the object set comprises availing all of the objects of the object set for synchronization when the synchronization mode is set to a first identification state, and limiting synchronization to particular ones of the objects of the object set in accordance with a second selective synchronization process.

6. The method of claim 1, wherein synchronizing only the subset of objects comprises availing only the objects of the subset of objects for synchronization when the synchronization mode is set to a second identification state, and limiting synchronization to particular ones of the objects of the subset in accordance with a second selective synchronization process.

7. A computer-readable medium having computer-executable instructions for performing the steps recited in claim 1.

8. A method for selectively synchronizing a subset of folders of an e-mail folder hierarchy between a server computer and a client computer, the method comprising:

defining the subset of the e-mail folder hierarchy as a collection of the folders forming a predetermined branch of the e-mail folder hierarchy;

facilitating single-action entry of a synchronization mode designator to be used for multiple subsequent synchronizing acts;

setting a synchronization mode based on the synchronization mode designator to a first synchronization mode or a second synchronization mode;

synchronizing all of the folders of the e-mail folder hierarchy when the synchronization mode designator corresponds to the first synchronization mode; and synchronizing only the folders forming the predetermined branch of the e-mail folder hierarchy and prohibiting synchronization of the folders which are not among the predetermined branch of the e-mail folder hierarchy when the synchronization mode designator corresponds to the second synchronization mode.

9. The method of claim 8, wherein synchronizing only the predetermined branch comprises prohibiting synchronization of the folders external to the predetermined branch of the e-mail folder hierarchy until the synchronization mode designator is changed to correspond to the first synchronization mode.

10. The method of claim 8, wherein synchronizing all of the folders of the email folder hierarchy comprises permitting synchronization of all of the folders of the e-mail folder hierarchy until the synchronization mode designator is changed to correspond to the second synchronization mode.

11. The method of claim 8, wherein synchronizing only the predetermined branch comprises further limiting the folders of the predetermined branch to be synchronized in accordance with a second selective synchronization method.

12. The method of claim 11, wherein the second selective synchronization method comprises:

defining a predetermined user action as an implicit user request for synchronization of a group of folders within the predetermined branch associated with the predetermined user action;

assigning a flag to each of the folders in the group of folders upon recognition of a user action corresponding to the predetermined user action; and synchronizing only the folders having the flag assigned thereto.

13. The method of claim 8, wherein synchronizing all of the folders of the email folder hierarchy comprises limiting the folders of the e-mail folder hierarchy to be synchronized in accordance with a second selective synchronization method.

14. The method of claim 13, wherein the second selective synchronization method comprises:

defining a predetermined user action as an implicit user request for synchronization of a group of folders associated with the predetermined user action;

assigning a flag to each of the folders in the group of folders upon recognition of a user action corresponding to the predetermined user action; and synchronizing only the folders having the flag assigned thereto.

15. The method of claim 8, wherein facilitating single-action entry comprises providing a computer-implemented toggle switch via a user interface.

16. The method of claim 15, wherein providing a computer-implemented software toggle switch via a user interface comprises providing a selectable icon on a graphical user interface which allows optional designation of exclusive synchronization of the defined subset of folders.

17. The method of claim 8, wherein synchronizing only the folders of the predetermined branch when in the second synchronization mode comprises overriding exclusive synchronization of the folders forming the predetermined branch by allowing specifically identified folders external to the predetermined branch to be synchronized during electronic connection of the server and client computers.

18. The method of claim 17, further comprising returning to exclusive synchronization of the folders forming the predetermined branch upon a subsequent electronic connection of the server and client computers.

19. A computer program storage medium readable by a computing system and encoding a computer program of instructions for executing a computer process in an e-mail system at a client computer, the computer process selectively synchronizing a subset of folders of an e-mail folder hierarchy between a server computer and the client computer, the computer process comprising:

defining the subset of the e-mail folder hierarchy as a plurality of selected folders of the e-mail folder hierarchy;

facilitating single-action entry of a synchronization mode designator to be used for multiple subsequent synchronizing acts until entry of a different synchronization mode designator;

receiving a selection identifier corresponding to the synchronization mode designator;

setting the synchronization mode designator based on the selection identifier to a first synchronization mode or a second synchronization mode;

permitting synchronization of all of the folders of the e-mail folder hierarchy when the synchronization mode designator is set to the first synchronization mode; and permitting synchronization of only the subset of folders of the e-mail folder hierarchy when the synchronization mode designator is set to the second synchronization mode, thereby prohibiting synchronization of the folders external to the subset of folders.

20. The computer program storage medium of claim 19, wherein facilitating single-action entry of a synchronization mode designator comprises providing an electronic toggle switch via a user interface.

21. The computer program storage medium of claim 20, wherein providing an electronic toggle switch via a user interface comprises providing a selectable icon on a graphical user interface which allows optional designation of exclusive synchronization of the defined subset of folders.

22. The computer program storage medium of claim 20, wherein providing an electronic toggle switch via a user interface comprises providing a text entry interface which allows keystroke designation of exclusive synchronization of the defined subset of folders.

23. The computer program storage medium of claim 19, wherein the computer process for permitting synchronization of only the subset of folders further comprises limiting the subset of folders to be synchronized in accordance with a computer process comprising:

defining a predetermined user action as an implicit user request for synchronization of a group of folders associated with the predetermined user action;

assigning a flag to each of the folders in the group of folders upon recognition of a user action corresponding to the predetermined user action; and synchronizing only the folders having the flag assigned thereto.

24. The computer program storage medium of claim 19, wherein the computer process for permitting synchronization of all of the folders of the e-mail folder hierarchy further comprises limiting the folders of the e-mail folder hierarchy to be synchronized in accordance with a computer process comprising:

defining a predetermined user action as an implicit user request for synchronization of a group of folders associated with the predetermined user action;

assigning a flag to each of the folders in the group of folders upon recognition of a user action corresponding to the predetermined user action; and synchronizing only the folders having the flag assigned thereto.

25. The computer program storage medium of claim 19, wherein permitting synchronization of only the subset of folders of the e-mail folder hierarchy when in the second synchronization mode comprises overriding exclusive synchronization of the subset of folders by allowing specifically identified folders external to the subset of folders to be synchronized during electronic connection of the server and client computers.

26. A computer data signal embodied in a carrier wave readable by a computing system and encoding a computer program of instructions to execute a computer process for selectively synchronizing a subset of folders of an e-mail folder hierarchy between a server computer and a client computer, the computer process comprising:

defining the subset of the e-mail folder hierarchy as a collection of the folders forming a predetermined branch of the e-mail folder hierarchy;

providing an interface for a user to enter a synchronization mode designator set to a first state or a second state to be used for multiple subsequent synchronizing acts until entry of a different synchronization mode designator;

receiving the synchronization mode designator;

synchronizing all of the folders of the e-mail folder hierarchy when the synchronization mode designator is in the first state; and synchronizing only the collection of folders forming the predetermined branch of the e-mail folder hierarchy and prohibiting synchronization of the folders which are not among the predetermined branch of the e-mail folder hierarchy when the synchronization mode designator is in the second state.

27. The computer data signal of claim 26, wherein the computer process further comprises determining whether the synchronization mode designator is in the first state or the second state.

28. The computer data signal of claim 26, wherein providing an interface for a user to enter a synchronization mode designator comprises providing a selectable icon on a graphical user interface which allows optional designation of exclusive synchronization of the defined subset of folders.

29. The computer data signal of claim 26, wherein providing an interface for a user to enter a synchronization mode designator comprises providing a text entry interface which allows keystroke designation of exclusive synchronization of the defined subset of folders.

30. An apparatus for selectively synchronizing a subset of folders of an e-mail folder hierarchy between a server computer and a client computer, the apparatus in the client computer comprising:

a folder subset definition module defining the subset of the e-mail folder hierarchy as a collection of folders forming a predetermined branch of the e-mail folder hierarchy;

a user interface module facilitating single-action entry of a synchronization mode designator identifying a first synchronization mode or a second synchronization mode to be used for multiple subsequent synchronizing acts until entry of a different synchronization mode designator;

a synchronization module synchronizing all of the folders of the e-mail folder hierarchy when the synchronization mode designator identifies the first synchronization mode, and synchronizing only the folders forming the predetermined branch of the e-mail folder hierarchy and prohibiting synchronization of the folders which are not among the predetermined branch of the e-mail folder hierarchy when the synchronization mode designator identifies the second synchronization mode.

31. The apparatus as in claim 30, wherein the user interface module comprises a graphical user interface module to present a selectable icon on the graphical user interface to facilitate optional designation of exclusive synchronization of the defined subset of folders.

32. The apparatus as in claim 30, further comprising a compare module comparing the synchronization mode designator entered by the user to a predetermined code to determine whether the synchronization module is operating in the first synchronization mode or the second synchronization mode.

33. The apparatus as in claim 30, wherein the synchronization module comprises a recursive synchronization module to recursively synchronize the folders having been assigned a synchronization mode designator in a top-down fashion from a top of the e-mail folder hierarchy to a bottom of the e-mail folder hierarchy.

34. A computer program storage medium readable by a computing system and encoding a computer program of instructions for executing a computer process in an e-mail system at a client computer, the computer process selectively synchronizing a subset of folders of an e-mail folder hierarchy between a server computer and the client computer, the computer process comprising:

defining the subset of the e-mail folder hierarchy as a plurality of selected folders of the e-mail folder hierarchy;

facilitating single-action entry of a synchronization mode designator to be used for multiple subsequent synchronizing acts until entry of a different synchronization mode designator, wherein facilitating single-action entry of a synchronization mode designator includes providing at least one electronic toggle switch via a user interface including providing an audio interface which allows voice-activated designation of exclusive synchronization of the defined subset of folders;

receiving a selection identifier corresponding to the synchronization mode designator;

setting the synchronization mode designator based on the selection identifier to a first synchronization mode or a second synchronization mode;

permitting synchronization of all of the folders of the e-mail folder hierarchy when the synchronization mode designator is set to the first synchronization mode; and permitting synchronization of only the subset of folders of the e-mail folder hierarchy when the synchronization mode designator is set to the second synchronization mode, thereby prohibiting synchronization of the folders external to the subset of folders.

35. The computer program storage medium of claim 34, wherein providing an electronic toggle switch via a user interface further comprises providing a selectable icon on a graphical user interface which allows optional designation of exclusive synchronization of the defined subset of folders.

36. The computer program storage medium of claim 34, wherein providing an electronic toggle switch via a user interface further comprises providing a text entry interface which allows keystroke designation of exclusive synchronization of the defined subset of folders.

37. The computer program storage medium of claim 34, wherein the computer process for permitting synchronization of only the subset of folders further comprises limiting the subset of folders to be synchronized in accordance with a computer process comprising:

defining a predetermined user action as an implicit user request for synchronization of a group of folders associated with the predetermined user action;

assigning a flag to each of the folders in the group of folders upon recognition of a user action corresponding to the predetermined user action; and synchronizing only the folders having the flag assigned thereto.

38. The computer program storage medium of claim 34, wherein the computer process for permitting synchronization of all of the folders of the e-mail folder hierarchy further comprises limiting the folders of the e-mail folder hierarchy to be synchronized in accordance with a computer process comprising:

defining a predetermined user action as an implicit user request for synchronization of a group of folders associated with the predetermined user action;

assigning a flag to each of the folders in the group of folders upon recognition of a user action corresponding to the predetermined user action; and synchronizing only the folders having the flag assigned thereto.

39. The computer program storage medium of claim 34, wherein permitting synchronization of only the subset of folders of the e-mail folder hierarchy when in the second synchronization mode comprises overriding exclusive synchronization of the subset of folders by allowing specifically identified folders external to the subset of folders to be synchronized during electronic connection of the server and client computers.

40. A computer data signal embodied in a carrier wave readable by a computing system and encoding a computer program of instructions to execute a computer process for selectively synchronizing a subset of folders of an e-mail folder hierarchy between a server computer and a client computer, the computer process comprising:

defining the subset of the e-mail folder hierarchy as a collection of the folders forming a predetermined branch of the e-mail folder hierarchy;

providing an interface for a user to enter a synchronization mode designator set to a first state or a second state to be used for multiple subsequent synchronizing acts until entry of a different synchronization mode designator, wherein providing an interface for a user to enter a synchronization mode designator includes providing an audio interface which allows voice-activated designation of exclusive synchronization of the defined subset of folders;

receiving the synchronization mode designator;

synchronizing all of the folders of the e-mail folder hierarchy when the synchronization mode designator is in the first state; and synchronizing only the collection of folders forming the predetermined branch of the e-mail folder hierarchy when the synchronization mode designator is in the second state.

41. The computer data signal of claim 40, wherein the computer process further comprises determining whether the synchronization mode designator is in the first state or the second state.

42. The computer data signal of claim 40, wherein providing an interface for a user to enter a synchronization mode designator comprises providing a selectable icon on a graphical user interface which allows optional designation of exclusive synchronization of the defined subset of folders.

43. The computer data signal of claim 40, wherein providing an interface for a user to enter a synchronization mode designator comprises providing a text entry interface which allows keystroke designation of exclusive synchronization of the defined subset of folders.

* * * * *

UNITED STATES PATENT AND TRADEMARK OFFICE
CERTIFICATE OF CORRECTION

PATENT NO.    : 6,636,897 B1  
DATED         : October 21, 2003  
INVENTOR(S)   : Sherman et al.

It is certified that error appears in the above-identified patent and that said Letters Patent is hereby corrected as shown below:

Drawings,
Figure 5, should have -- . . . -- by "Level$_4$"; markings omitted on patent drawing.

Column 2,
Line 64, replace "mail" with -- e-mail --.

Signed and Sealed this

Eleventh Day of May, 2004

JON W. DUDAS
*Acting Director of the United States Patent and Trademark Office*